J. H. BRADNACK.
HOSE SPLICE.
APPLICATION FILED AUG. 29, 1911.
1,083,269.
Patented Jan. 6, 1914.
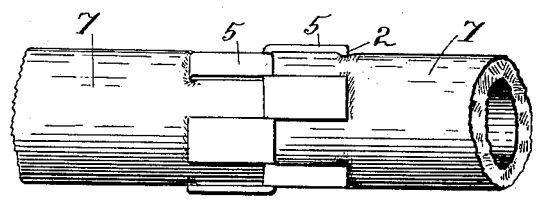
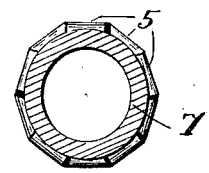
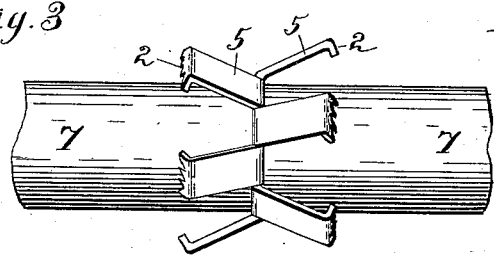
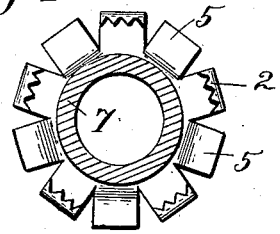
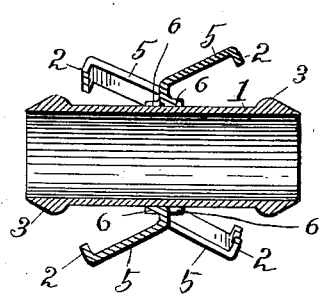
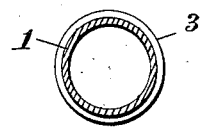
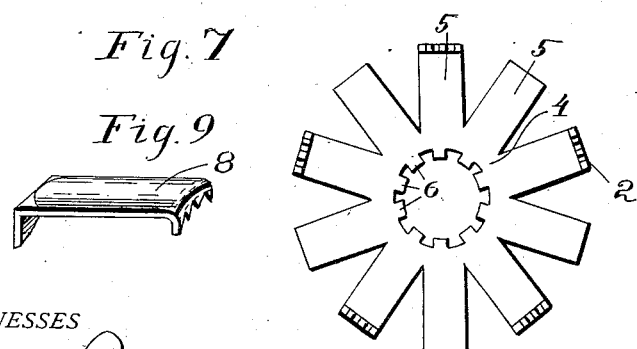
WITNESSES
Linus Barnes
Willis Barnes
INVENTOR
John H. Bradnack
By George L. Barnes Attorney

UNITED STATES PATENT OFFICE.

JOHN H. BRADNACK, OF NEW HAVEN, CONNECTICUT.

HOSE-SPLICE.

1,083,269. Specification of Letters Patent. Patented Jan. 6, 1914.

Application filed August 29, 1911. Serial No. 646,731.

*To all whom it may concern:*

Be it known that I, JOHN H. BRADNACK, a citizen of the United States of America, and resident of New Haven, in the county of New Haven and State of Connecticut, have invented certain new and useful Improvements in Hose-Splices, of which the following is a specification.

My invention relates to a hose splice, and has for its object to provide a device for readily splicing or connecting parts of hose or flexible tubing in a continuous conduit.

The invention consists in the novel combination, arrangement and construction of parts as hereinafter more fully described and claimed.

In the accompanying drawings forming a part of this specification, Figure 1 is a view of two sections of hose and a hose splice embodying my improvement. Fig. 2 is an end view of Fig. 1. Fig. 3 is a view of two sections of hose coupled together in readiness for splicing, but with the holding arms of the splicing mechanism spread apart and unfastened. Fig. 4 is an end view of the same. Fig. 5 is a central longitudinal section through the splicing mechanism without the hose shown ready to receive the same. Fig. 6 is a cross section of the tubular core of the splicing mechanism. Fig. 7 is a plan view of the blank for forming the holding part or clasp of the splicing mechanism. Fig. 8 is a lengthwise section of a core having the bead rolled in without change of thickness of the metal. Fig. 9 is a view of one of the holding arms shaped to the curvature of the periphery of the hose.

Referring to the drawings, my improved hose splice is shown to comprise two parts, viz., the core or shell 1 upon which the respective pieces of the tubing are received and connected, and the holding clasp, which is formed with counterpart series of grappling and binding arms for holding the respective parts of the hose upon the core, as hereinafter set forth.

The core or shell 1 comprises a metal tube of sufficient length to form a substantial bearing for the respective ends of the hose to be joined, and which are tightly forced upon it, with their ends near the central cross plane thereof. Upon each end of the tube is an external annular enlargement or bead 3 soldered, brazed or formed thereon by increase of the thickness of the metal on the outside, as shown in Fig. 5, or rolled or otherwise formed thereon by curvature or distortion of the sheet metal from straight longitudinal lines without thickening of the part, as shown in the modification A in Fig. 8, presenting a more or less abrupt shoulder on the inner side or that toward the central cross plane of the tube, and a tapering or conical surface on the opposite side or mouth of the tube, as shown in Fig. 5. As the hose is of rubber or other elastic material, it will stretch sufficiently to enable the said enlargement to pass in to it in the operation of forcing the hose upon the core, and will collapse again to tightly encircle the neck of the core inside the bead, as shown in said Fig. 5.

The holding clasp is formed of sheet metal, which in the process of manufacture is first blanked out in the shape shown in Fig. 7 comprising the central collar or annular part 4 adapted to fit upon the core 1, with the arms 5 radiating therefrom, and the small tongues 6 projecting interiorly from the collar. Said tongues are designed to be bent over at right angles to the plane of the collar, that is parallel to its axis, alternately projecting in opposite directions, and forming a proportionately extended bearing for the collar upon the tubular core. The collar is to be placed upon the core prior to the enlarging of its ends to form the beads 3, which are larger than the bearing of the collar, and its position is ordinarily at the central cross plane of the core, midway of the ends thereof.

The radiating arms 5 of the clasp, forming the hose binding and holding parts of the device, are also bent over alternately in opposite directions from the original plane of the sheet metal, or cross plane of the core when the clasp is placed thereon, and their ends are bent over at right angles to the arms, projecting toward the axis forming the hooks 2. Said arms are at first bent over to an angle intermediate of the cross plane and axis of the core as shown in Figs. 3, 4 and 5. With the arms standing at such an angle oblique to the axis of the core the respective sections of hose 7 to be joined may be forced upon the core, over the beads thereof, until their ends are substantially or nearly in juxtaposition with the annular part of the clasp, located near the middle cross plane of the core. Then, in the operation of splicing the parts the arms may be bent flat down upon the hose as shown in Figs. 1 and 2 with the hooks embedded therein to hold the tubing against endwise strain thereon. With the arms thus bent down the splice is completed, and the parts of the hose will be as securely connected together as if made integral.

As an article of manufacture the device will be supplied to the trade formed as shown in Fig. 3 and will then be applied by general users in mending hose, the only implement necessary for such purpose being an implement for forcing or hammering the arms 5 down flat on the hose and embedding the hooks therein. The arms may be made of the curvature of the hose transversely from the point of bending to the ends of the hooks, as shown in the modification of the arm 8 in Fig. 9, thus fitting more snugly and being stronger. The collar from which the arms project is to be tightly fitted or forced on the core and held secure against turning thereon, for which purpose key projections 9 may be raised on the core, as shown in Fig. 8, to engage the tongue 6. When the device is galvanized or tinned such process operates to hold the parts together as if integrally soldered thereto.

The clasp, with the arms 5 in the position shown in Fig. 3, forms a very effective grip for firmly holding the core in one hand while the hose sections are being forced upon it by the other. Thus the core may be twisted or wrung as the hose is drawn upon it, and the parts forced together in very tight contact. The arms are proportioned as to length suitably to engage the tubing with their hooked ends 2 just back of the beads 3, which also tends to hold the hose securely on the core, and the hooks may be serrated as shown.

As the core is continuous from one end to the other, it provides a tight joint at the meeting ends of the hose, which can not leak after the arms 5 are forced down solidly upon them. The respective series of arms are also joined together integrally, so that strain upon one series, tending to draw the hose therefrom are communicated to and counteracted by an equal and opposite strain upon the other series, and there is no joint in the mechanism other than that between the respective sections of the tubing.

It will be seen that the blank shown in Fig. 7, and which is at first a perfectly flat piece of metal of substantially circular shape, provides all the parts of the completed clasp, and is easily formed by first removing the wedge-shaped areas between the exteriorly radiating arms, and the central area having the interiorly projecting tongues, and then bending the arms from the plane of the plate in alternate directions and the tongues also in alternation to form a substantial bearing for the plate on the shell. There is little waste of metal in this process, and the completed product comprises a very compact, neat and easily applied device.

I claim as my invention:

1. A hose splice comprising in combination a tubular shell for the reception of the hose sections, and a hose grapple comprising an annular plate received upon the shell formed with contiguous externally radiating arms which are alternately bent down in opposite directions from the plane of the plate for engagement with the hose sections and hooked to indent the surface thereof, and internal projections bent out in opposite directions to provide an extended bearing of the plate upon the shell.

2. A hose splice comprising in combination a tubular shell adapted for insertion into the ends of the hose sections, having an enlargement at each end, and a hose grapple comprising an annular plate formed with contiguous externally radiating arms which are alternately bent down in opposite directions from the plane of the plate for engagement with the hose sections and hooked to indent the surface thereof, and internal projections bent out in opposite directions to provide an extended bearing of the plate upon the shell.

Signed by me at New Haven, Conn., this 25th day of August, 1911.

JOHN H. BRADNACK.

Witnesses:
 GEORGE L. BARNES,
 CHARLES SPREYER.

---

Copies of this patent may be obtained for five cents each, by addressing the "Commissioner of Patents, Washington, D. C."